United States Patent
Gordon et al.

(10) Patent No.: US 10,592,947 B2
(45) Date of Patent: *Mar. 17, 2020

(54) FACILITATING MITIGATION OF DANGEROUS ACTIVITIES

(71) Applicant: International Business Machines Corporation, Armonk, NY (US)

(72) Inventors: Michael S. Gordon, Yorktown Heights, NY (US); Clifford A. Pickover, Yorktown Heights, NY (US); Maja Vukovic, New York, NY (US); Komminist Weldemariam, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 367 days.

This patent is subject to a terminal disclaimer.

(21) Appl. No.: 15/429,955

(22) Filed: Feb. 10, 2017

(65) Prior Publication Data

US 2018/0232833 A1 Aug. 16, 2018

(51) Int. Cl.
*G06Q 30/00* (2012.01)
*G06Q 30/06* (2012.01)
*G06Q 50/26* (2012.01)

(52) U.S. Cl.
CPC ..... *G06Q 30/0607* (2013.01); *G06Q 30/0601* (2013.01); *G06Q 30/0623* (2013.01);
(Continued)

(58) Field of Classification Search
CPC ........... G06Q 30/0601; G06Q 30/0607; G06Q 50/26; G06Q 30/0623; G06Q 30/0627; G06Q 30/0185
(Continued)

(56) References Cited

U.S. PATENT DOCUMENTS 8,135,740 B2* 3/2012 Friedlander ....... G06F 16/24565
707/780
9,202,184 B2* 12/2015 Friedlander .... G06Q 10/063112
(Continued)

FOREIGN PATENT DOCUMENTS

CN 104751318 A 7/2015

OTHER PUBLICATIONS

Tan, et al., "Social Action Tracking via Noise Tolerant Time-varying Factor Graphs," Proceedings of the 16th ACM SIGKDD International Conference on Knowledge Discovery and Data Mining (KDD '10), 2010, pp. 1049-1058, ACM, New York, NY, USA.
(Continued)

*Primary Examiner* — Yogesh C Garg
(74) *Attorney, Agent, or Firm* — Amin, Turocy & Watson, LLP

(57) ABSTRACT

Techniques facilitating mitigation of dangerous activities are provided. In one example, a computer-implemented method can include detecting, by a system operatively coupled to a processor, a trigger event based on a determination that a security risk level satisfies a defined condition associated with the security risk level. The security risk level can be associated with an item of interest and a monitored behavior related to the item of interest. The computer-implemented method can also include implementing, by the system, an action that mitigates an impact of the security risk level. The action can be implemented as the trigger event is detected and the action can be determined based on the item of interest and the monitored behavior.

8 Claims, 10 Drawing Sheets

(52) U.S. Cl.
CPC ......... *G06Q 30/0627* (2013.01); *G06Q 50/26* (2013.01); *G06Q 30/0185* (2013.01)

(58) Field of Classification Search
USPC .................. 705/26.1, 26.25, 26.61, 26.63
See application file for complete search history.

(56) References Cited

U.S. PATENT DOCUMENTS

| | | | |
|---|---|---|---|
| 10,270,790 | B1* | 4/2019 | Jackson .............. H04L 63/1425 |
| 2006/0070127 | A1 | 3/2006 | Friedlander et al. |
| 2008/0208838 | A1 | 8/2008 | Friedlander et al. |
| 2009/0069949 | A1* | 3/2009 | Carpenter ............ B67D 1/0021 700/283 |
| 2009/0259687 | A1* | 10/2009 | Do ..................... G06F 16/9535 |
| 2011/0082718 | A1 | 4/2011 | Ghosh |
| 2014/0272896 | A1 | 9/2014 | Malik et al. |
| 2014/0304208 | A1 | 10/2014 | Ouzounian |
| 2014/0358805 | A1 | 12/2014 | Cama et al. |
| 2015/0142587 | A1 | 5/2015 | Salgar et al. |
| 2015/0193774 | A1 | 7/2015 | Wetzel |
| 2016/0005029 | A1 | 1/2016 | Ivey et al. |
| 2017/0192401 | A1* | 7/2017 | Wexler ................. G06K 9/6267 |

OTHER PUBLICATIONS

Guest, "List of Common Chemicals Used to Make Bombs Released in Bid to Stem Terrorism," The World Today, May 23, 2013, 2 pages. http://www.abc.net.au/news/2013-05-23/govt-releases-list-of-household-chemicals-used-for-terrorism/4708948.

Ingold, "Ingredients for Bomb Could be Found at Home," The Denver Post, Sep. 18, 2009, 3 pages. Last accessed Jan. 11, 2017. http://www.denverpost.com/2009/09/18/ingredients-for-bomb-could-be-found-at-home/.

Barbee, et al., "Rice Professor Urges Tighter Monitoring of Bomb-Making Chemicals," Lubbock Avalanche-Journal, Feb. 27, 2011, 6 pages. Last accessed Jan. 11, 2017. http://lubbockonline.com/local-news/2011-02-27/rice-professor-urges-tighter-monitoring-bomb-making-chemicals#.

"Bomb-Making Materials Awareness Program," Department of Homeland Security, Oct. 6, 2016, 3 pages. Last accessed Jan. 11, 2017. https://www.dhs.gov/bomb-making-materials-awareness-program.

Hodge, "Homeland Security Will Track Fertilizer Buyers," Nov. 12, 2008, WIRED, 4 pages. Last accessed Jan. 11, 2017. https://www.wired.com/2008/11/homeland-securi/.

"Centrality," Wikipedia (the free encyclopedia), 12 pages. Last accessed Jan. 11, 2017. https://en.wikipedia.org/wiki/Centrality.

Mell et al., "The NIST Definition of Cloud Computing," NIST Special Publication 800-145, Sep. 2011, National Institute of Standards and Technology, U.S. Department of Commerce, 7 pages.

Office Action for U.S. Appl. No. 15/841,553 dated Apr. 27, 2018, 26 pages.

List of IBM Patents or Applications Treated as Related.

Final Office Action received for U.S. Appl. No. 15/841,553 dated Jun. 11, 2019, 21 pages.

Non-Final Office Action dated Oct. 3, 2019, for U.S. Appl. No. 15/841,533.

Anonymous, Pharmacies Use Online Database to Stop the Sale of Illegal Amounts of Key Ingredient Used to Make Methamphetamines, Sep. 18, 2009, PRWeb Newswire, 3BNR, 221763006, pp. 1-2. (Year 2009).

Notice of Allowance received for U.S. Appl. No. 15/841,553 dated Nov. 27, 2019, 31 pages.

\* cited by examiner

FACILITATING MITIGATION OF DANGEROUS ACTIVITIES

BACKGROUND

The subject disclosure relates to mitigation of dangerous activities, and more specifically, facilitating mitigation of dangerous activities related to a harmful recipe database and associated risk levels.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for bid advising in resource allocation data analytics frameworks are described.

According to an embodiment, a computer program product facilitating mitigation of dangerous activities can comprise a computer readable storage medium having program instructions embodied therewith. The program instructions are executable by a processing component. The program instructions can cause the processing component to detect, by the processing component, a trigger event based on a first risk level satisfying a defined condition. The first risk level can be associated with a first item of interest and a monitored behavior associated with the first item of interest. The first item of interest can be selected from one or more items of interest included in a harmful recipe database. The first risk level can be based on a multidimensional risk array. The program instructions can also cause the processing component to facilitate, by the processing component, an action to mitigate an impact of the first risk level based on the trigger event. The action can be selected from a group of actions based on the first risk level, the first item of interest, and the monitored behavior.

According to an embodiment, a computer-implemented method can comprise detecting, by a system operatively coupled to a processor, a trigger event based on a determination that a security risk level satisfies a defined condition associated with the security risk level. The security risk level can be associated with an item of interest and a monitored behavior related to the item of interest. The computer-implemented method can also include implementing, by the system, an action that mitigates an impact of the security risk level. The action can be implemented as the trigger event is detected and the action can be determined based on the item of interest and the monitored behavior.

According to another embodiment, a system can comprise a memory that stores computer executable components and a processor that executes computer executable components stored in the memory. The computer executable components can comprise an observation component that can detect a trigger event based on a risk level satisfying a defined condition of the risk level. The risk level can be associated with an item of interest and a monitored behavior associated with the item of interest. The computer executable components can also comprise an implementation component that performs an action to mitigate an impact of the risk level based on the trigger event. The action can be selected from a group of actions based on the risk level, the item of interest, and the monitored behavior.

DETAILED DESCRIPTION

Figure 1:
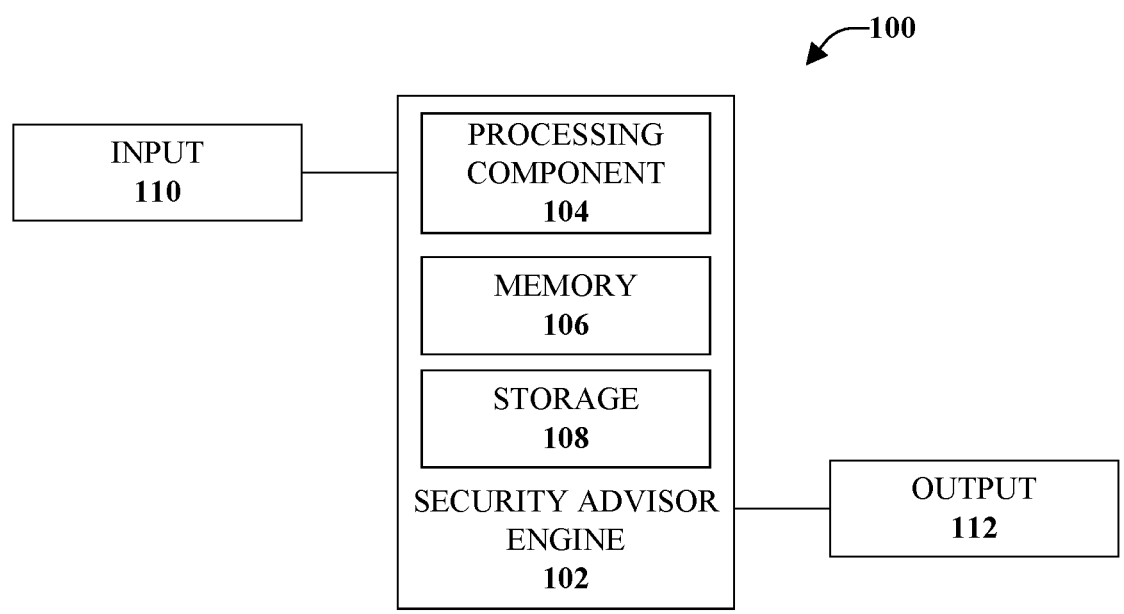
FIG. 1 illustrates a block diagram of an example, non-limiting system that facilitates mitigation of a dangerous activity in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The various aspects discussed herein relate to the mitigation of risk from one or more rogue entities by detecting actions that can have the likelihood of being preparations to perpetuate activity that is against the law. According to an implementation, a system can include a harmful recipe database that can be populated with various information related to, for example, ingredients, such as chemicals, hardware, improvised bomb components, and so on. Further, the information contained in the harmful recipe database can be assigned an associated risk level R. The risk level R can be determined based on a single ingredient and/or a combination of ingredients (e.g., a bundle). The risk level R can also be determined based on a behavior of an entity (or a set of entities) that is/are attempting the purchase the ingredient(s), has purchased the ingredient(s), and/or has an interest in the ingredient(s). Additionally or alternatively, the risk level R can be based, at least in part, on an event with which the ingredient(s) and/or entity (or set of entities) has a connection. For example, the event can be a public event (e.g., an athletic event, a political event, an amusement event) and/or a location associated with an event. The risk level R can be multidimensional. For example, dimensions can include risk of harm to property, risk of harm to people, risk of short-term effect, risk of long-term effect, risk that components are likely to be connected with a larger dangerous mechanism, risk associated with an event and/or a location of interest, and so on. Weights can be assigned to the various dimensions, wherein the weight can correspond to an amount of risk of the associated dimension. For example, a first weight can be assigned to a first dimension, a second weight can be assigned to a second dimension, and a subsequent weight can be assigned to a subsequent dimension. Two or more of the first weight, the second weight, and the subsequent weight may be a same weight, similar weights, or different weights. The risk score multiplied by the weight can be computed to determine a product for each dimension. A sum of the products across all dimensions can be utilized to determine a final risk level.

The ingredients can be monitored for purchase by an entity or by entities. As utilized herein an entity can be one or more computers, the Internet, one or more systems, one or more commercial enterprises, one or more computers, one or more machines, machinery, one or more actors, one or more users, one or ore more customers, one or more humans, and so forth, hereinafter referred to as an entity or entities depending on the context. In another example, the ingredients can be monitored for an Internet browsing activity engaged in by the entity or entities through respective computing devices. Further, behavior associated with one or more entities showing interest in the materials or ingredients can be monitored.

Based on the monitoring, one or more actions can be facilitated and/or automatically taken (e.g., an amelioration action). The actions can include, but are not limited to providing alerts, triggering additional monitoring for an entity and/or a social network, preventing purchase, a delay of delivery, alerting law enforcement officials, a change of a Graphical User Interface (GUI), such as a change at an e-commerce website, additional tracking of a purchase, requiring biometric fingerprint or other biometric capturing at time of purchase, the automatic forcing of an online attempted purchase to an in-store purchase, etc. According to some implementations, the behavior can be suspicious behavior in relation to the circumstances in which items are purchased, (e.g., using cash instead of credit card). In some cases, the "order" in which items are purchased can be monitored and/or predicted (e.g., purchasing product 1 and thereafter purchasing product 2) and/or the timing between purchasing can be monitored (e.g., purchasing product 1 and within a defined amount of time purchasing product 2).

Additionally, a social network can be taken into consideration with respect to showing interest (e.g., purchasing or browsing) of materials.

FIG. 1 illustrates a block diagram of an example, non-limiting system 100 that facilitates mitigation of a dangerous activity in accordance with one or more embodiments described herein. Aspects of systems (e.g., non-limiting system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can comprise a security advisor engine 102, a processing component 104, a memory 106, and/or a storage 108. In some embodiments, one or more of the security advisor engine 102, the processing component 104, the memory 106, and/or the storage 108 can be communicatively and/or electrically coupled to one another to perform one or more functions of the system 100. In some embodiments, the security advisor engine 102 can receive as input 110 a list of ingredients that, alone or in combination, can indicate suspicious behavior. For example, rogue entities can gather ingredients that individually do not seem dangerous, however, when assembled together, the combination of ingredients can produce something that can be dangerous or risky. The ingredients and/or list of ingredients can be maintained in a database, such as a harmful recipe database.

Examples of the ingredients and/or their features can include, but are not limited to, chemicals, hardware, components, improvised bomb components. Another example can be radioactive isotopes for Weapons of Mass Destruction (WMD) components. Drain cleaner and rust remover can be other examples, some of which could contain nitric or sulphuric acid, which can be utilized to make the high order explosive nitro-glycerine. A further example can be model engine fuel since some model engines run on nitromethane, which is a chemical with explosive properties greater than TNT and, when mixed with an oxidating agent, such as ammonium nitrate, the explosive power can be even greater than TNT. Pool sanitizer can be another example and can be a product that contains hydrogen peroxide, which can be a chemical used to make an explosive known as TATP or triacetone triperoxide. Other examples can include hydrogen peroxide, nail-remover, and others. The nature of the ingredient (e.g., powder form, liquid form, gas form, and so on) can also be an input 110. Further, in various embodiments, the size, quantity, and volume (e.g., a 55-gallon drum) of the ingredient can be an input 110. Other examples can be ammonium nitrate-based fertilizers and shrapnel components. Still other examples can be chemicals used for preparation of controlled substances. In addition, ingredients for biological weapons can be an input 110, which can include an heightened focus toward toxins, bacteria, fungi, and viral agents as well as materials used in weaponization, transport and maintaining potency, genetic manipulation, and persistence in the environment.

In accordance with an embodiment, the security advisor engine 102, additionally or alternatively, can receive as input 110 an indication from one or more computing devices (e.g., over a communications network) that one or more ingredients within the list has been obtained by one or more entities (e.g., a rogue entity). For example, various ingredients can be obtained from different sources (e.g., on-line, a store having a physical presence, and so on). The input 110 can be received from respective computing devices of one or more entities (e.g., trans-vendor sources) that can be related (e.g., owned by the same parent company) or are not related (e.g., competitors). The indication received from the different sources can be obtained upon a successful purchase or upon an attempt to purchase but before the purchase is completed.

According to some embodiments, the input 110 can be an indication that an entity has an interest in one or more ingredients and/or characteristics thereof. For example, an entity can perform an Internet based search for ingredients to create an explosive device, or instructions as to how to make an explosive device. In another example, an entity can perform an Internet based search for chemicals that can cause pulmonary distress when made into aerosolized form (e.g., in the form of ultramicroscopic solid or liquid particles that are dispersed or suspended in the air. In accordance with this embodiment, the input 110 can be received directly from a computing device into which the search was input or from another device (e.g., an internet service provider device, an Internet search engine device, and so on).

According to another embodiment, the input 110 can include information indicative of a behavior, which can include suspicious behavior in relation the circumstances in which the item (e.g., item of interest) is purchased. For example, suspicious behavior can include the purchaser using cash instead of a credit card, buying small quantities of similar items at different location, acting guilty (or suspicious) when purchasing the item, and so on. In some instances, the order in which items are purchased can be monitored and received as input 110. Alternatively or additionally, timing between purchases of items can be monitored and received as input 110. For example, if a first product is purchased and then, within a defined time period, a second product is purchased, the time difference between the purchases can indicate an intent to cause harm with the products. For example, a variant of item-based collaborative filtering recommendation can be used to compare the different purchases.

In accordance with an embodiment, the security advisor engine 102 upon receiving the input 110 can generate one or more outputs 112 that can include actions that can mitigate an impact to a security risk level. For example, the output 112 can include (or can facilitate generation of information indicative of) a modification to an attribute related to a purchase of the item of interest. For example, the attribute can be a price of an item (e.g., an increase, a decrease). In another example, the attribute can be a timing of obtaining the item (e.g., product is listed as "out of stock" regardless of the quantity available). Another example of the attribute can be a location of the purchase (e.g., an attempt is made to purchase over the Internet and the purchaser is instructed to visit a physical store to obtain the item). For example, if the entity attempts to buy fertilizer through an on-line e-commerce website, the entity can be denied the purchase and instructed to go to a local store (which can be identified by the website). The reasoning to move the on-line purchase to an in-person purchase is that an identification of the entity can be determined and/or other cues (e.g., body language) can be analyzed during the purchase, which cannot be performed on-line.

In another example, the attribute can be a delivery characteristic (e.g., for a shipment a delivery is delayed, a signature is necessary for delivery of the item, a pick-up at a transportation company rather than a home delivery). The attribute can also include an identity verification (e.g., the purchaser is instructed to provide proof of identification in order to purchase the item, the purchaser is instructed to go to a particular location to provide the identity verification).

The output 112 can be provided in any perceivable format. In an example, the output 112 can in the form of a visual representation that provides easily understandable information. For example, the output 112 can include the item being purchased, an identity of an entity performing the purchase, an expected place and/or time or usage of the item, and so on. The output 112 can be in an electronic format that includes written words through a display and/or verbal through speakers or other output devices. Further, the output 112 can be provided to devices associated with a law enforcement, a security agency, a vendor (e.g., physical store), and so on.

The systems and/or the components of the systems discussed herein can be employed to use hardware and/or software to solve problems that are highly technical in nature (e.g., determine a combination of items results in a particular security risk level even though the items are purchased across different vendors (e.g., a trans-vendor service) and mitigation of a dangerous activity by automatic implementation of an attribute related to the purchase), that are not abstract and that cannot be performed as a set of mental acts by a human. In an example, various machine learning and natural language processing algorithms (e.g., item-based collaborative filtering recommendation, user behavior analytics, event detection) can be customized. Further, due to the volume, velocity, variety, and veracity of data, as well as the real-time (e.g., nearly instantaneous) decision making, a human, or even thousands of humans, cannot efficiently, accurately and effectively manually generate the necessary data and perform the predictions/monitoring as discussed herein. In another example, the different vendors can be a combination of on-line vendors and vendors having a physical presence (e.g., a physical store, a physical booth at a mall or trade show), and, therefore, coordination of the purchases placed among the different vendors cannot be determined, and appropriate action taken, as a set of mental acts. In another example, the attribute that is automatically implemented can relate to one or more of a timing, a price, a location, a delivery characteristic, and an identity verification, which cannot be executed as a set of mental acts. Further, some of the processes performed can be performed by specialized computers for carrying out defined tasks related to the mitigation of one or more dangerous activities and can be implemented across both on-line entities and entities that have a physical presence at a defined location (e.g., vendors) and can be a result of one or more activities associated with a single individual or a set of individuals. The systems and/or components of the system (s) can be employed to solve new problems that arise through advancements in technology, computer networks, the Internet, Internet of Things (IoT) devices, and the like. The systems and/or components of the systems can provide technical improvements to facilitate mitigation of dangerous activities based on a multidimensional risk array that can be determined as a result of an item of interest and a behavior associated with the item of interest, etc.

Figure 2:
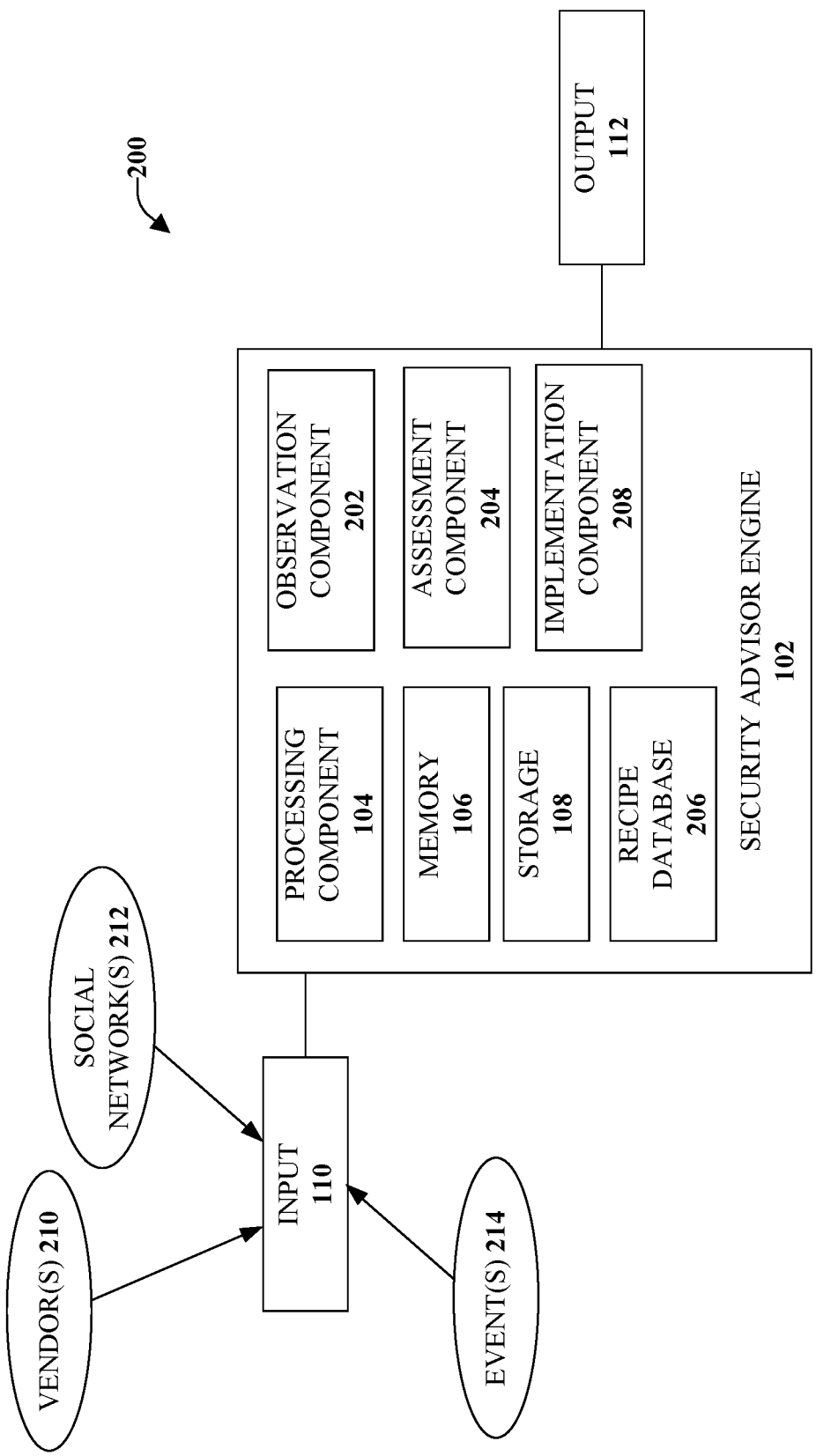
FIG. 2 illustrates a block diagram of an example, non-limiting system that facilitates mitigation of one or more dangerous activities by one entity or a set of entities in accordance with one or more embodiments described herein.

FIG. 2 illustrates a block diagram of an example, non-limiting system 200 that facilitates mitigation of one or more dangerous activities by one entity or a set of entities in accordance with one or more embodiments described herein. Repetitive description of like elements employed in other embodiments described herein is omitted for sake of brevity.

Non-limiting system 200 can comprise one or more of the components and/or functionality of system 100, and vice versa. The security advisor engine 102 can include an observation component 202, an assessment component 204, and an implementation component 208. Also included can be a recipe database 206 that can be separate from the memory 106 and/or the storage 108, or can be included, at least partially, in the memory 106 and/or the storage 108. In some embodiments, the recipe database 206 can be communicatively coupled to one or more of the memory 106 and/or the storage 108 via a network.

The observation component 202 can receive input 110 from one or more sources, which can be a vendor device adapted to generate information about a vendor, a social network device adapted to generate information about an entity utilizing the social network, and/or another device adapted to generate information about an event. According to an implementation, a source can be one or more vendor devices 210 that are providing the input 110 (e.g., over a communications network). For example, the one or more vendor devices 210 can be associated with suppliers of product (e.g., ingredients) or can facilitate the supply of product (e.g., a vendor device associated with an intermediary that facilitates communications between the purchaser and the seller). Further, the one or more vendor devices 210 can be associated with online vendors (e.g., electronic commerce or e-commerce company) and/or vendors having a physical presence (e.g., a local hardware store, a local retail store).

In accordance with another implementation, the one or more sources that provide input can be one or more social network devices 212 that are providing the input 110 (e.g., over a communications network). For example, a social network device can generate information that indicates an interest (e.g., purchasing or browsing) of materials by members of a social network or by entities within the same social network chasing similar items or "ingredients." In some implementations, the observation component 202 can monitor (e.g., a purchase, a showing of interest in) a bundling of ingredients within a social network based on information received by one or more social network devices 212.

For example, the observation component 202 can utilize a measure of network centrality, which can be a degree centrality, which is defined as the number of links or connections of a node (e.g., an identifier indicative of an entity that is part of a social network). Another example of a measure of network centrality can be a closeness centrality and, in a social network context, the normalized closeness centrality (or closeness) of a node is the average length of the shortest path between the node and all other nodes in the social network. Thus the more central a node is, the closer it is to all other nodes in the social network. For example, in a social network, the closeness centrality can refer to a degree of connection between entities in the social network. A further example of a measure of network centrality is a betweenness centrality, which is a centrality measure of a vertex within a social network, which quantifies the number of times a node acts as a bridge along the shortest path between two other nodes. As an example, betweenness centrality can be an indicator of a node's centrality in a social network. The centrality can be equal to the number of shortest paths from all vertices to all others that pass through that node. A node with high betweenness centrality can have a large influence on the transfer of items through the network, under the assumption that item transfer follows the shortest paths. Another example of a measure of network centrality is Eigenvector centrality, which is a measure of the influence of a node in the social network. The Eigenvector centrality assigns relative scores to all nodes in the social network based on the concept that connections to high-scoring nodes contribute more to the score of a defined node than equal connections to low-scoring nodes. Yet another example of a measure of network centrality is Katz centrality, which measures the number of all nodes that can be connected through a path (e.g., a social network path), while the contributions of distant nodes are penalized. Still another example of a measure of network centrality is PageRank centrality, which is a variant of the Eigenvector centrality, and measures the number of PageRanks of nodes in a social network, where the term "PageRanks" refers to an importance of a node by counting a number and quality of links to the node to estimate the node's importance (e.g., a more important node will have a higher number and quality of links than a less important node.

Thus, the social network can provide information that connects two or more entities. Based on this connection, activities across the two or more entities can be monitored for cooperative preparation of one or more dangerous activities (e.g., entity 1 purchases product 1 and entity 2 purchases product 2, where when combined, products 1 and 2 create dangerous product 3).

Additionally, the source that provides the input can provide an indication of one or more events 214. For example, correlations can be made with various events (e.g., athletic events, parades, etc) likely to be targets of dangerous activities. One or more news feeds, social media feeds, or other feeds can be utilized to determine when and where an event is likely to be held, and/or the relationship between the event and the likelihood of a dangerous attack being carried out at the event. In another example, communications between two or more entities can be analyzed to determine if the entities are exhibiting an interest in devices and/or ingredients. The communications can be captured through respective computing devices of the entities or through other computing devices (e.g., security cameras installed in a physical store).

The assessment component 204 can determine a security risk level R for the monitored behavior and/or actions. In an example, the risk level R can be determined based on a risk array, which can be a multidimensional risk array. A multidimensional array is an array that has more than two dimensions. A two-dimensional array uses two subscripts for indexing, namely, a row index and a column index. A multidimensional array uses additional subscripts for indexing. For example, a three-dimensional array uses three subscripts, namely, a rank array dimension 1 (e.g., the row), dimension 2 (e.g., the column); and dimension 3 (e.g., a page). As dimensions are added, corresponding subscripts are added. For example, a four-dimensional array has four subscripts (the first two reference a row-column pair; the second two access third and fourth dimensions of data.

According to various aspects, the risk level can be assigned using heuristic or machine learning. For example, an entry in the multidimensional risk array is a feature vector $<f_1, f_2, \ldots, f_n>$), where each $f_i$ represents a single feature (e.g. date, time, number of crowd participants, material type, etc.) and has an associated risk score (e.g., in a scale between 1 and 0, 1 to 100, etc), which can be determined based on a number of factors as discussed above. The risk assessment component 204 can aggregate the risk scopes to determine the risk level for an entity.

For example, a dimension of the multidimensional risk array can include information related to materials, chemicals, hardware, biological agents, and so on. Another dimension can be a risk of combination of two or more materials or other items. A further dimension can be transactions and items already purchased as well as other items that can be combined with the item already purchased. Another dimension can be whether it is a single entity or an entity that is part of a social network performing the action or exhibiting the suspicious behavior. Further, in addition to the actual ingredients being purchased or of interest, the destruction level caused by the ingredients can be a dimension. In addition, the location risk can be a dimension of the multidimensional array. Another dimension can be the danger level or how dangerous the item is (e.g., will it cause a little damage, a large amount of damage, or a level of damage therebetween). Other dimensions can include risk of harm to property, risk of long-lasting effect, risk that components are actually likely to be part of some larger dangerous mechanism, and so on. A further dimension can be the risk for the particular day. For example, if a large crowd is expected to appear, the risk could be bodily damage to one or more individuals. Further, the risk array can include a state of the entity, including what is known about the entity, or what can be discovered about the entity. For example, if the entity has been determined to have a high potential of implementing a dangerous activity, a higher risk weight can be applied to the entity. In another example, if the entity is affiliated with organizations and/or has expressed an interest in organizations that are know for implementing dangerous activities, a higher risk weight can be assigned to the entity.

As discussed above, the risk level R can be multidimensional. For example, dimensions can include risk of harm to property, risk of harm to people, risk of short-term effect, risk of long-term effect, risk that components are likely to be connected with a larger dangerous mechanism, and so on. A final or composite risk level R(final) can optionally be computed from the various components of risk. For example, consider R(final)=w1*R1+w2*R2+w3*R3, where w1, w2, and w3 are weights. In an example, w1 may be a higher weight (or concern) for risk R1 of direct harm to people compared to w2, which may be a weight applied to a risk R2 dealing with a risk of debilitating traffic congestion.

According to another example, a news feed can be utilized to determine that the risk might be higher on a particular day, week, or month, based on different activities or events occurring in the area, including holiday activities. Thus, the inputs for the risk array can be dynamic and can change (even significantly) over time. Further, the assessment component 204 can estimate size of weapon, destructive potential, location of possible use, etc. Further, locations of purchase can be used to estimate where a dangerous activity might occur in the future. For example, the estimate can be based on a common geographic location between a place of purchase and a location of an event (e.g., within a same city or within a defined distance between the place and purchase and the location of the event. In addition, the assessment component 204 can automatically consider transactions/materials purchased so far, and then can predict the likelihood of buying the next material M, which can be related to creating destruction with risk level R.

The various aspects can employ supervised or unsupervised learning techniques for detecting an event E (e.g., public gathering in Times Square from 1 p.m. to 3 p.m.) from social media (e.g., through respective social media devices). The detected event can have a predicted time, date, possible coverage area of the event (e.g., 1 mile radius), as well as estimated total number of crowd for said event E using a plurality of historic event data.

According to an implementation, the observation component 202 and/or the assessment component 204 can employ social-network-based vouching for the behavior of the entity. This can tie the entities into a network of vouching that can be useful, in the situation where something is later amiss. For example, if a behavior of an entity is suspicious, members of that entity's social network can be contacted to provide additional information about the entity and/or to confirm an identification of the entity.

The implementation component 208 can affect recommendations. For example, an automated website e-commerce behavior can be to output a prompt that indicates, "we see you are buying X—you might need Y too." This behavior can be modified or filtered (or even blocked) by the implementation component 208 so that dangerous combinations of ingredients are not readily suggested during an e-commerce transaction. Alternatively or additionally, the implementation component 208 can adjust an e-commerce site pricing based on risk R. For example, the implementation component 208 can lower a price after vouching (e.g., social network vouching) has been completed and the determination is that the risk level is low for the entity. However, it is noted that this vouching can be suspect, but at least the vouching ties entities into a network of vouching that can be useful, in the event something is later amiss. According to some implementations, the implementation component 208 can modify an attribute related to a purchase of the item of interest. For example, the attribute can be a price, a timing, a location, a delivery characteristic, an identity verification, or combinations thereof.

The amelioration action taken by the implementation component 208 can include, but is not limited to, providing alerts, facilitating additional monitoring for the entity and/or social network, preventing a purchase, delaying delivery, changing of a GUI interface (e.g., at the e-commerce website), additional tracking of a purchase, requiring a biometric fingerprint or biometric capturing at time of purchase, automatic forcing of an online attempted purchase to an in-store purchase, notification to authorities (e.g., police, HAZMAT, Homeland Security) etc. According to some implementations, predictive techniques, such as noise tolerant time varying graphs can be used to monitor and anticipate purchasing activities (leading towards realization of harmful recipes) in the social network.

In another embodiment, a cognitive agent (e.g., the assessment component 204) can use the detected or predicted event E to correlate an event with one or more activities of a rogue entity. For example, the agent can determine based on a purchasing activity, a sequence of materials purchased, and/or a user social network graph (computed from user social interaction and engagement, and so on based on social network data) that a single entity or a combination of two or more entities is planning a dangerous activity during the event E.

According to an embodiment, telco data (e.g., call history, Short Message Services (SMSs), and so on) can be analyzed to further complement the social network analysis, event detection, and correlation with a pattern of detected recipes with ingredients leading to potential destruction. For example, communications of two or more communication devices can be analyzed to determine if identification of entities associated with the communication devices are operating together (e.g., based on communications between at least two of the communications devices even though those entities are not connected through a social network). Thus, if a first purchase is made through utilization of one of the communications devices, and a second purchase is attempted through utilization of a second communications device (determined to be associated with the first communications device), and the second purchase includes ingredients that, when combined with ingredients of the first purchase can create a dangerous item, the second purchase can be denied, delayed, or another action taken as discussed herein.

Further, a smart notification or alert generation can based on the risk or concern level and sent to law enforcement authorities automatically. A GUI to display the sequence of materials, related to risk level, events, can also be provided. The GUI can be used to review the risk level and enable filtering of artifacts, operations and records from the recipe database system.

Figure 3:
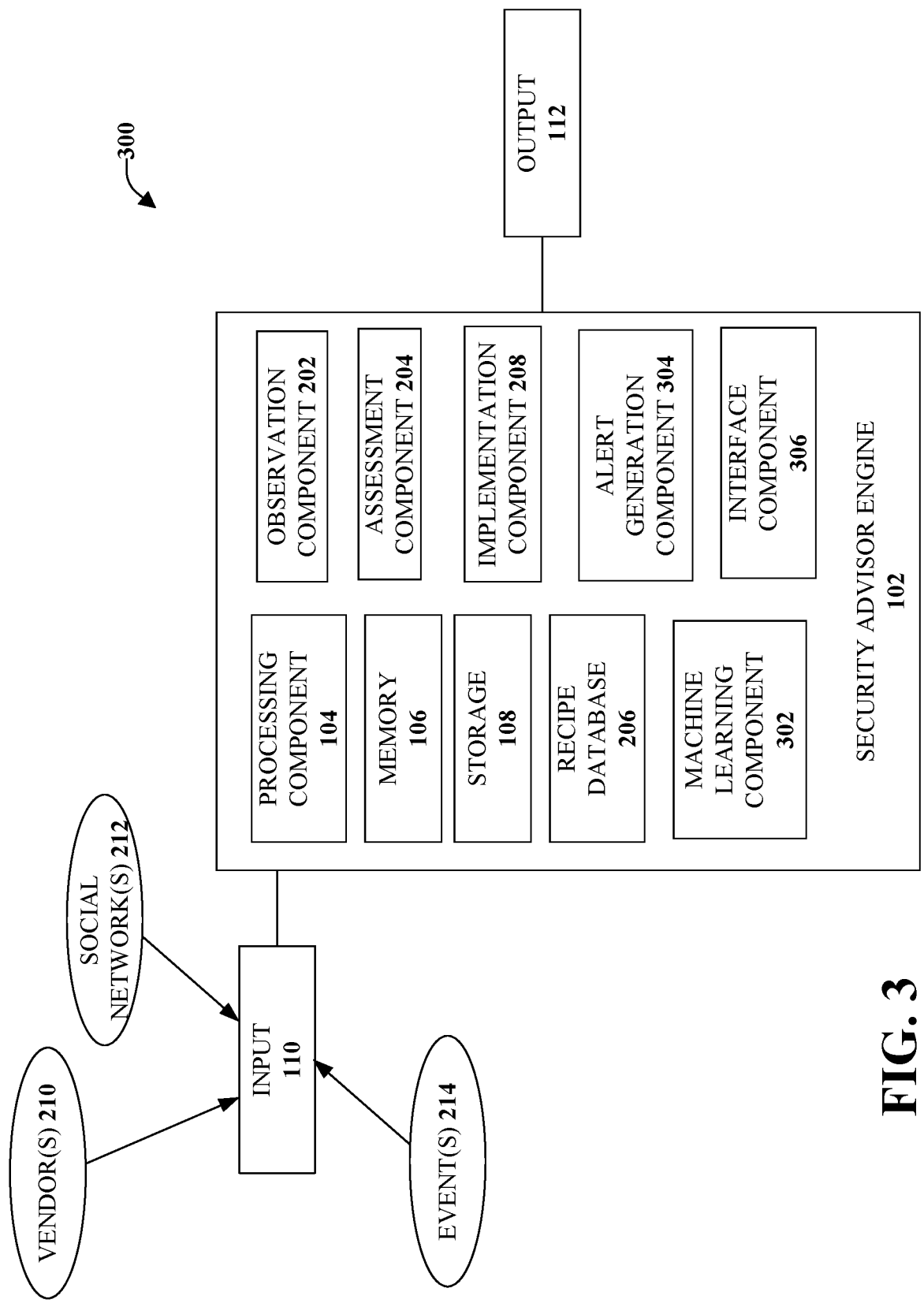
FIG. 3 illustrates a block diagram of an example, non-limiting system that facilitates mitigation of a dangerous activity and provides an indication of a potential of the dangerous activity to one or more entities distinct from the system in accordance with one or more embodiments described herein.

FIG. 3 illustrates a block diagram of an example, non-limiting system 300 that facilitates mitigation of a dangerous activity and provides an indication of a potential of the dangerous activity to one or more entities distinct from the system 300 in accordance with one or more embodiments described herein. Repetitive description of like elements employed in other embodiments described herein is omitted for sake of brevity.

Non-limiting system 300 can comprise one or more of the components and/or functionality of systems 100 and/or system 200 and vice versa. The harmful recipe database 206 can include ingredients with risk levels R (e.g., chemicals, hardware, components). The observation component 202 can monitor activities and/or receive indications (e.g., behaviors) relates to purchase and/or browsing of an ingredient and/or a combination of ingredients contained in the recipe database 206. Further, the observation component 202 can monitor behavior associated with one or more entities showing interest in the materials (e.g., one or more ingredients). The assessment component 204 can evaluate the behavior(s) and determine a risk level associated with the behavior.

For example, the observation component 202 can determine that an entity has an interest and/or has purchased a first item of interest. The assessment component 204 assign a first risk level to the first item of interest and a monitored behavior associated with the first item of interest (e.g., associated with the entity). Based on the first risk level satisfying a defined condition, the assessment component 204 can determine that a trigger event has occurred. For example, the defined condition can be that the entity is more likely than not to use the first item of interest to perform a dangerous activity. In another example, the defined condition can be that an event is occurring and there is a high probability that the item of interest will be used to cause harm at the event. Based on the first risk level, the implementation component 208 can take one or more amelioration actions as discussed herein.

In an embodiment, the system 300 can include a machine learning component 302. The machine learning component 302 can perform a set of machine learning computations associated with the input 110 and/or the output 112. For example, the machine learning component 302 can monitoring interest in one or more items of interest included in a harmful recipe database, monitoring purchases of the one more items of interest, activities or behaviors of a single entity, or two or more entities, with respect to one or more items of interest identified in the harmful recipe database 206.

The machine learning component 302 can utilize machine learning systems that have been explicitly or implicitly trained to learn, determine or infer ingredients that should be included in the harmful recipe database 206, ingredients that are frequently used together to produce a dangerous condition, assigning weights to parameters associated with ingredients, detecting behavior associated with entities interested in the ingredients, and so on. It is to be appreciated that machine learning systems can be implemented in one or more of the components to generate explicitly and/or implicitly trained models that provide a risk array and associated risk levels for one or more ingredients. The machine learning systems can learn ingredients, recipes, chemical reactions, identify entities operating together, and so on, in order to determine or infer a potential that preparations for a dangerous activity are in process.

According to some implementations, an alert generation component 304 can transmit one or more alerts to an entity distinct from the system 300, or to multiple entities distinct from the system 300. For example, the alert can be communicated through an interface component 306 that can provide the alert as an output 112 to one or more entities that can be distinct from the system 300. For example, the entity or the one or more entities distinct from the system 300 can be law enforcement, security experts, and/or analysts that can perceive the output 112 and take action, in addition to the action being taken by the system 300. In another example, alerts can be sent to stores (e.g., through respective computing devices), prior to a second ingredient being purchased. The alert can indicate for the stores to "be aware that customer 'XYA' might purchase fertilizer from your store." The alert can provide instructions to be taken if the identified customer attempts to purchase the ingredient (e.g., delay purchase, deny purchase, contact local law enforcement authorities).

According to an implementation, the interface component 306 can provide a mechanism to allow the one or more entities distinct from the system 300 to "dial" back and forth through a window of time, or to browse information for different time periods, to determine risks/recipes at a time period of interest. For example, the dial or other manner of searching historical information could allow entities to view aspects of the risk/recipe array from a defined time period (e.g., between 2000 and 2002) to determine what risk and recipes were employed during the selected range of time. This information can be useful to gain insight into how risks and recipes have evolved and/or to determine if there is a return to recipes from the past. To select the desired time frame, the entity can input one or more dates or can scroll through the database (e.g., a dial feature) to view or scan through the differences over time, or another search mechanism can be utilized (e.g., based on various components/ingredients and risks). For example, the interface component 306 can output data related to a recipe database for a defined time interval, which can be a configurable time interval. In an example, a user can interact with the recipe database and select different time intervals via a graphical user interface.

In an example, interface component 306 (as well as other interface components discussed herein) can provide a GUI, a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region can be viewable, can be employed. Thus, it might be inferred that the entity did want the action performed.

The entity can also interact with the regions rendered on the GUI to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Figure 4:
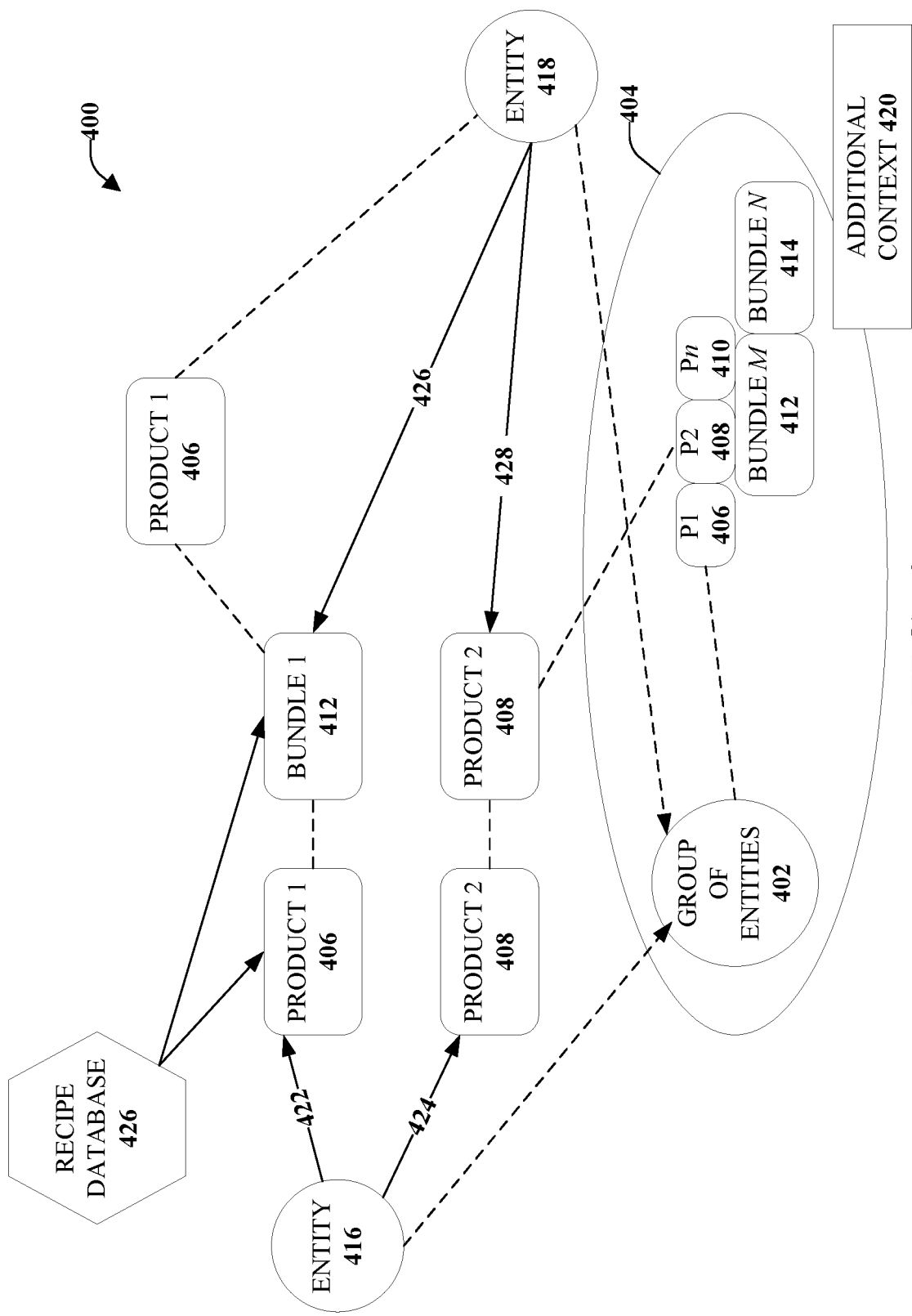
FIG. 4 illustrates an example, non-limiting conceptual representation of a harmful recipe prediction based on consumption of products by one or more entities that triggers an action to mitigate a dangerous activity in accordance with one or more embodiments described herein.

FIG. 4 illustrates an example, non-limiting conceptual representation 400 of a harmful recipe prediction flow chart based on consumption or purchase (including planned purchases) of products by one or more entities that triggers an action to mitigate a dangerous activity in accordance with one or more embodiments described herein.

A group of entities 402 can be associated with one another based on a social network (e.g., activities implemented through respective social network devices). For example, entities of the group of entities 402 can specifically indicate that such entity is associated with another entity through respective social network devices (e.g., computing devices, user devices, and so on). According to another aspect, the group of entities 402 can be indicated as related based on other parameters (e.g., groups belonged to, interests, common work place, common place of residence, and so on). Based on the determination that two or more entities should be part of the group of entities 402, patterns for those entities can be determined. The disclosed aspects can also be applied for a "lone wolf" or one person acting alone, that could be aided in the acquisition of ingredients by friends. For example, patterns can include routine buying patterns, commonality of interests, browsing habits, and so on. Based on the patterns, normal activities for the group of entities 402, or a single entity thereof, can be determined. For example, one or more entities can be gardeners and are part of a local garden club. In this example, it might not be uncommon for one or more of the entities within the group of entities 402 to purchase fertilizer, and might do so on a regular pattern (e.g., every spring and fall). Based on these known or expected purchases, a risk level assigned to the one or more entities can be weighted less significantly than a risk level assigned to another entity for which a fertilizer purchase is uncommon or not expected. Based on the determined patterns or predicted behavior of the group or single entity, a warning can be sent to stores, future purchases can be limited, and other actions can be taken as discussed herein.

The circled portion 404 of FIG. 4 indicates a consumption graph for the group of entities. Actions and/or purchases of the group of entities 402 can include a first product 406, a second product 408, through an n product 410, where n is an integer. Combinations of one or more of the first product 406, the second product 408, and the n product 410 can create a first bundle, Bundle M 412 through a Bundle N 414, wherein N is an integer. In an example, the first product 406 can be a first item of interest, the second product 408 can be a second item of interest, and the n product 410 can be an n item of interest (e.g., a subsequent item of interest).

A first entity 416 and a second entity 418 can be entities included in the group of entities 402. Actions related to the first entity 416 and the second entity 418 (as well as other entities) can be monitored. Based on the monitoring, one or more risk levels can be determined in view of additional context 420. The additional context 420 can include, but is not limited to, geographic location, time, local events, world events, calendar, chat history, and so on. For example, the chat history can include information contained in communications between entities of the group of entities 402 and/or information contained in communications with other entities (not included in the group of entities 402). The information contained in the communications can include identification of key words and/or phrases, data related to a specific event and/or location, and so on). In some instances, the communication information can indicate that a corresponding purchase, or attempt to purchase, is legitimate or, alternatively, has a potential to be part of a harmful activity. For example, if the first entity 416 and the second entity 418 are members of a local garden club talking about fertilizer, it can be determined that the fertilizer being purchased by one of the entities is for a legitimate purpose (e.g., for the garden maintained by the garden club). However, if the first entity 416 and the second entity 418 are discussing an event (e.g., a large gathering of people) and fertilizer is being purchased (and there is no other reason for fertilizer to be purchased by the entity based on information known about the entity), it can indicate the first entity 416, the second entity 418 and/or the group of entities 402 can be planning a harmful activity at the event.

In an example, the first entity 416 intends to purchase, as indicated by line 422 the first product 406. Further, it can be determined that purchase of the second product 408 should be reduced, at 424, as it relates to the first entity 416. For example, a harmful recipe database 426 can include various information related to the first product 406, the second product 408, the n product 410, Bundle M 412, Bundle N 414, other products, and/or other bundles. The harmful recipe database 426 can contain information indicating that when the first product 406 and the second product 408 are combined, the combination can create a dangerous or destructive product, or are components of a dangerous or destructive product (e.g., an improvised bomb, an improvised explosive, and so on).

Further, the second entity 418 can purchase, at 426, the first bundle 412, which can include the first product 406 and a third product (not illustrated). Further to this example, the second entity 418 selects the first bundle 412 and also selects the second product 408 for purchase, at 428. Based on the information known about the second entity 418, a determination can be made as to whether the second entity 418 should be allowed to purchase the second product 408.

According to an implementation, entities included in the group of entities 402, other than the first entity 416 and the second entity 418, can vouch for the first entity 416 and/or the second entity 418. For example, the one or more of the other entities within in the group of entities 402 can be trusted entities. Based on this trust, if the entity vouches for either the first entity 416 or the second entity 418 that trusted entity can be indicating that the purchase can be for a legitimate purchase, not a dangerous or harmful (e.g., illegitimate) purpose.

According to some implementations, a Noise Tolerant Time-varying (NTT) application for product consumption tracking and credit assessment (NTT++) can be utilized with the disclosed aspects. For this aspect, a social network can be represented as G+(U,E), where U is a set of |U|=N entities (e.g., users) and E⊂U×U is a set of directed and/or undirected links between the entities. Based on this, an entity's actions can be defined. Inputs can include a consumption action y, performed by an entity $u_i$, on a product/bundle s, at a time t. Action y can be of type end-user/consumer, function for reward computation. Entity u can be an end-user of an agent. Y can equal a consumption action history, which can equal $\{(y, u, s, t, r)\}_{i,t}$. Further, $y_{i,t}$ can be equal to $\{0,1\}$, which can be either performed (e.g., 1) or not performed (e.g., 0). For example, if a product is purchased, the action is "performed" and if a product is not purchased, the action is "not performed." $X^t=N\times d$ is the attribute matrix at time t. Each row $x_i$ can correspond to an entity; each column can correspond to an attribute. Element $x_{ij}$ is the $j^{th}$ attribute value of an entity $u_{i**}$ describes entity specific characteristics. For example, attributes can have "been purchasing P1 in the past five months," "in same town/geographic location," "views/searches products online," "purchases a bundle that contains s," "is friends with," and so on.

The input to the problem can be one or more attribute augmented networks. The following equation can be utilized for the attribute augmented network, $G=V^t$, $E^t$, $X^t$, $S^t$, $R^t$, $Y^t$), where $V^t$ is a set of entities, $E^t$ is a set of links between entities at a time t, and $S^t$ is a set of products/services/bundles. Based on this, purchase consumption tracking can be determined. A goal of purchase consumption tracking is to learn mapping function:

$$f\{G \ldots G^{T-1}V^TE^TS^TR^T\}\to Y^T$$

Further, a latent action state can be determined, according to the equation $Z_i^t=0,1$, which corresponds to a combination of observed action $y_i$ and a possible bias, to describe the actual intention degree of the entity to perform the action.

The context of the algorithm can include the entity's actions at time t are influenced by other entities' actions and events at a time that is less than t (e.g., <t), on a related product/bundle. Another context can also include that the entity's actions can be dependent on previous actions (on a given product/bundle). A further context can be that the entity's actions have a strong correlation. The outputs can indicate a set of predicted purchasing actions and a corresponding probability of those actions (e.g., can also include that the entity's actions can be dependent on previous actions (on a given product/bundle). A further context can be that the entity's actions have a strong correlation. The outputs can indicate a set of predicted purchasing actions and a corresponding probability percentage of those actions (e.g., y, % probability).

In such a manner, an intent and next action of one or more entities can be determined. Further, a risk level can be assigned to the next action, with a corresponding percentage probability of the action being taken. For example, if the percentage probability is below a threshold probability level, a mitigation action might not be taken. However, if the percentage probability is above the probability level, a mitigation action might be automatically taken. According to some implementations, the percentage probability can be included in the risk array.

Figure 5:
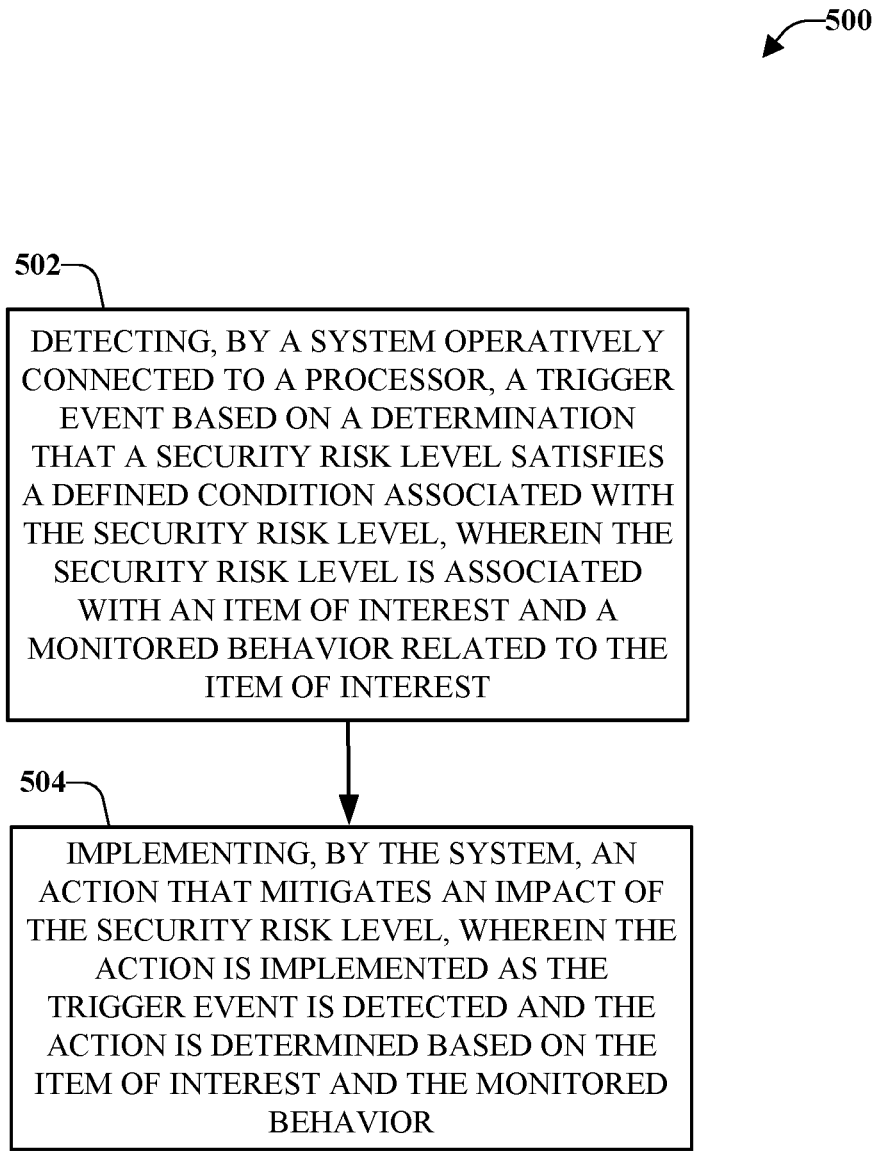
FIG. 5 illustrates a flow diagram of an example, non-limiting computer-implemented method that facilitates detection and mitigation of one or more dangerous activities in accordance with one or more embodiments described herein.

FIG. 5 illustrates a flow diagram of an example, non-limiting computer-implemented method 500 that facilitates detection and mitigation of one or more dangerous activities in accordance with one or more embodiments described herein. At 502, a system operatively coupled to a processor can detect a trigger event (e.g., via the observation component 202). For example, the trigger event can be detected based on a determination that a security risk level satisfies a defined condition associated with the security risk level. The security risk level can be associated with an item of interest and a monitored behavior related to the item of interest. At 504, an action that mitigates an impact of the security risk level can be implemented by the system (e.g., via the implementation component 208). The action can be implemented as the trigger event is detected and the action can be determined based on the item of interest and the monitored behavior.

According to an implementation, the monitored behavior can include a first event performed in connection with a first entity and a second event performed in connection with a second entity. The first event and the second event can be determined to be related based on an identity of an entity that caused a performance of the trigger event. In an example, the first event and the second event can be online purchases and the first entity and the second entity can be different devices associated with respective online merchants. In another example, the first event can be an online purchase and the first entity can be a device associated with an online merchant and the second event can be an in-store purchase and the second entity can be another device associated with a physical store (e.g., a local store).

Figure 6:
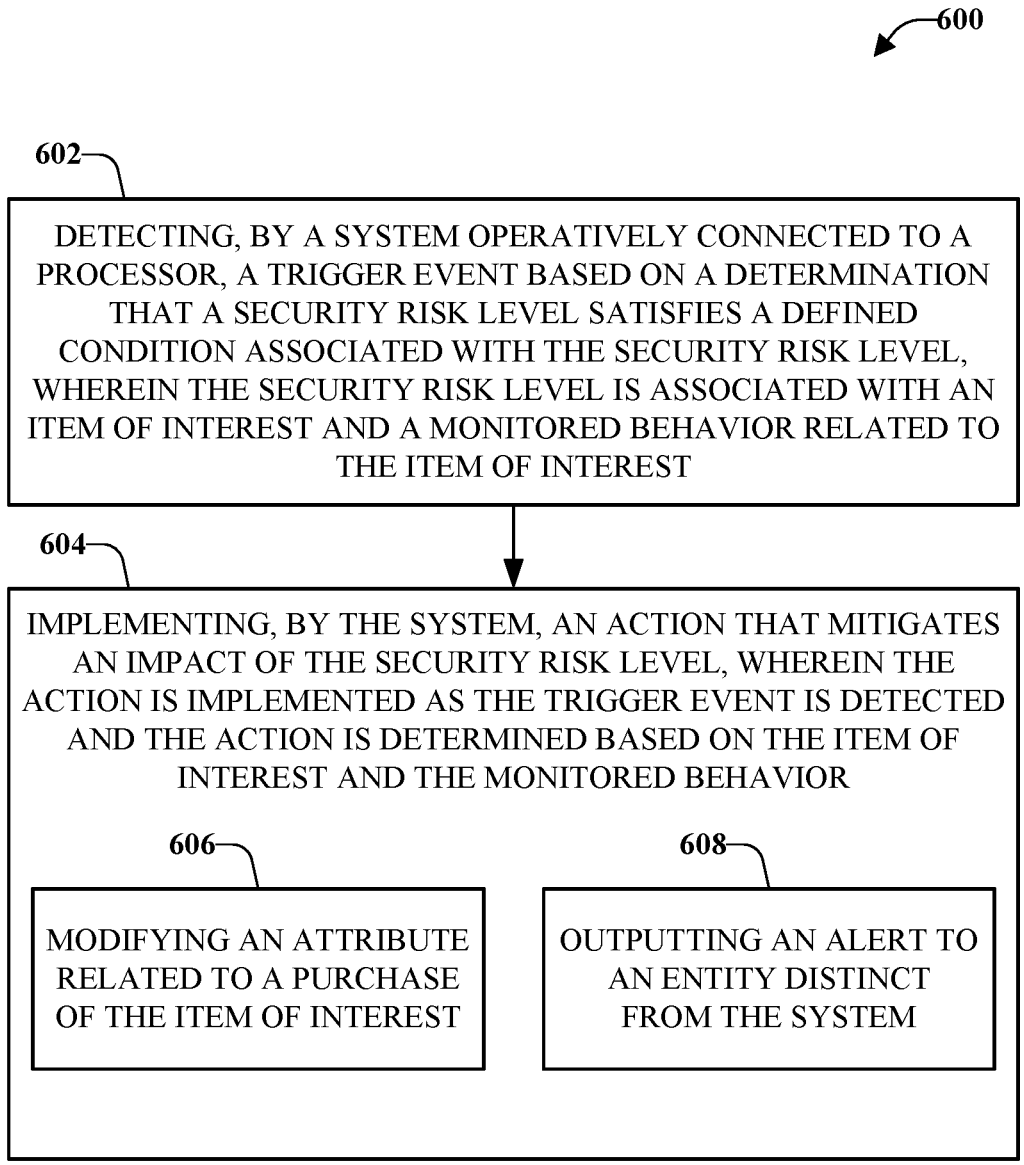
FIG. 6 illustrates a flow diagram of an example, non-limiting computer-implemented method that facilitates implementation of actions to mitigate risk in accordance with one or more embodiments described herein.

FIG. 6 illustrates a flow diagram of an example, non-limiting computer-implemented method 600 that facilitates implementation of actions to mitigate risk in accordance with one or more embodiments described herein. At 602, a system operatively coupled to a processor can detect a trigger event (e.g., via the observation component 202). For example, the trigger event can be associated with a purchase and/or interest in one or more ingredients contained in a recipe. Further, based on a behavior associated with the ingredient (e.g., behavior of an entity purchasing and/or interested in the ingredient) and risk level associated with the ingredient/behavior can be weighted higher or lower based on information known about the entity and/or other entities with which the entity has contact.

At 604, the system can implement an action that mitigates an impact of the security risk level (e.g., via the implementation component 208). According to an implementation, implementing the action can include modifying, at 206, an attribute related to a purchase of the item of interest (e.g., via the implementation component 208). Further to this implementation, the attribute can be selected from a group consisting of a price, a timing, a location, a delivery characteristic, and an identity verification.

According to another implementation, implementing the action can include alerting an entity distinct from the system, at 208 (e.g., via the alert generation component 304). For example, one or more law enforcement agencies can be provided an alert indicating that there is a potential for a harmful situation to occur in a local area. In another example, the alert can provide information to the law enforcement agencies to solicit assistance to mitigate the chances of the harmful situation from occurring. In an example, law enforcement personnel can physically visit one or more individuals to question them and determine their intent based on an alert(s) from the system.

Figure 7:
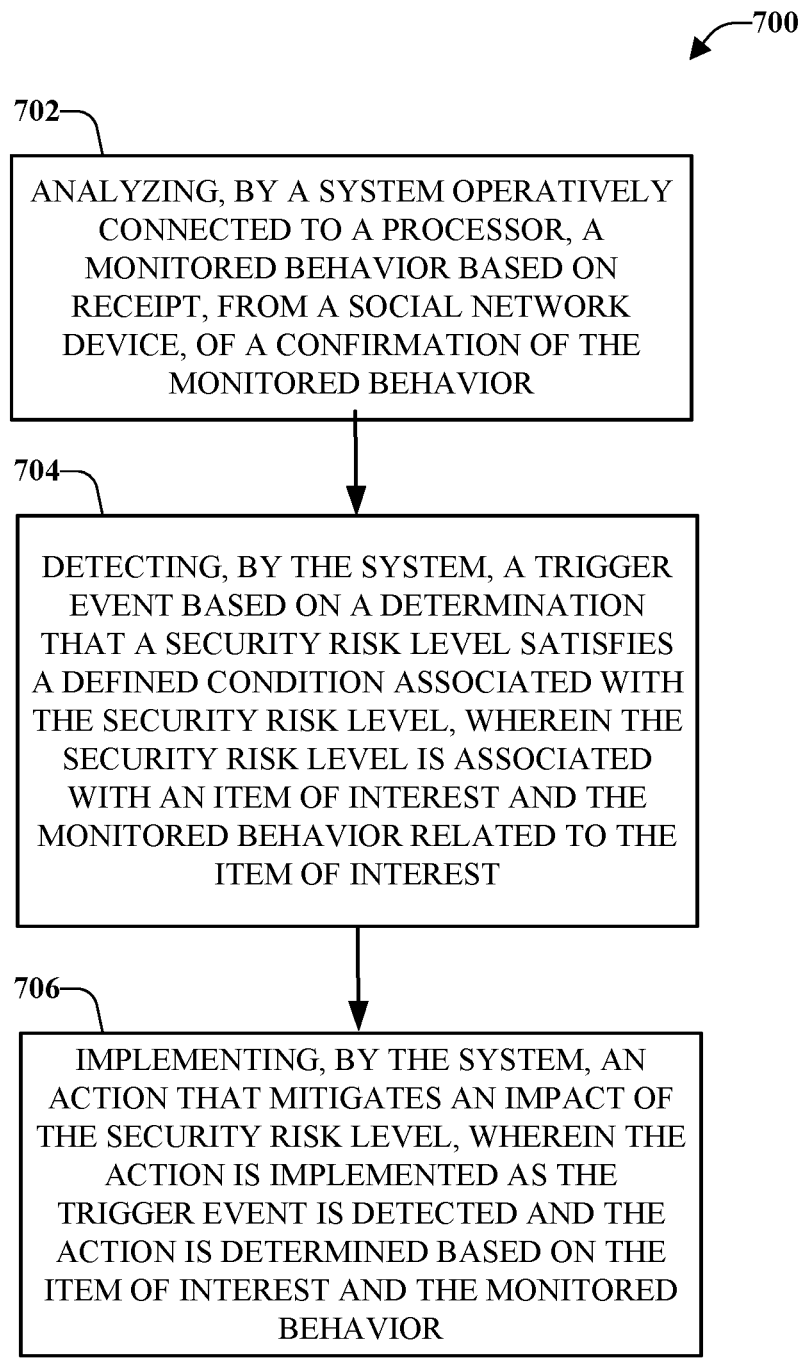
FIG. 7 illustrates a flow diagram of an example, non-limiting computer-implemented method that facilitates analysis of suspicious behavior within a social network context in accordance with one or more embodiments described herein.

FIG. 7 illustrates a flow diagram of an example, non-limiting computer-implemented method 700 that facilitates analysis of suspicious behavior within a social network context in accordance with one or more embodiments described herein. At 702, a system operatively coupled to a processor can analyze a monitored behavior and can solicit a confirmation of the monitored behavior (e.g., via the assessment component 204). For example, the monitored behavior can be a circumstance related to an activity concerning the item of interest. Further to this example, the activity can be selected from a group consisting of a purchase, an inquiry, and a communication. Additionally or alternatively, the circumstance can be selected from a group consisting of an order of a purchase of the item of interest and another purchase of another item of interest, and a time difference between the purchase and another purchase.

At 704, a trigger event can be detected (e.g., via that observation component 202) based on the analyzed behavior. For example, if the analyzed behavior is determined to be preparation of a dangerous action with a high certainty of the action being carried out, a risk level associated with the item of interest and the behavior can be assigned an appropriate risk level. If there is less certainty that the action will be carried out, a lower risk level can be assigned. When the risk level satisfied a condition (e.g., is higher than a defined threshold risk level), at 706, an action that mitigates an impact of the security risk level can be implemented (e.g., via the assessment component 204). The action can be implemented upon assignment of the risk level and prior to an actual purchase being made by the entity, according to an implementation.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
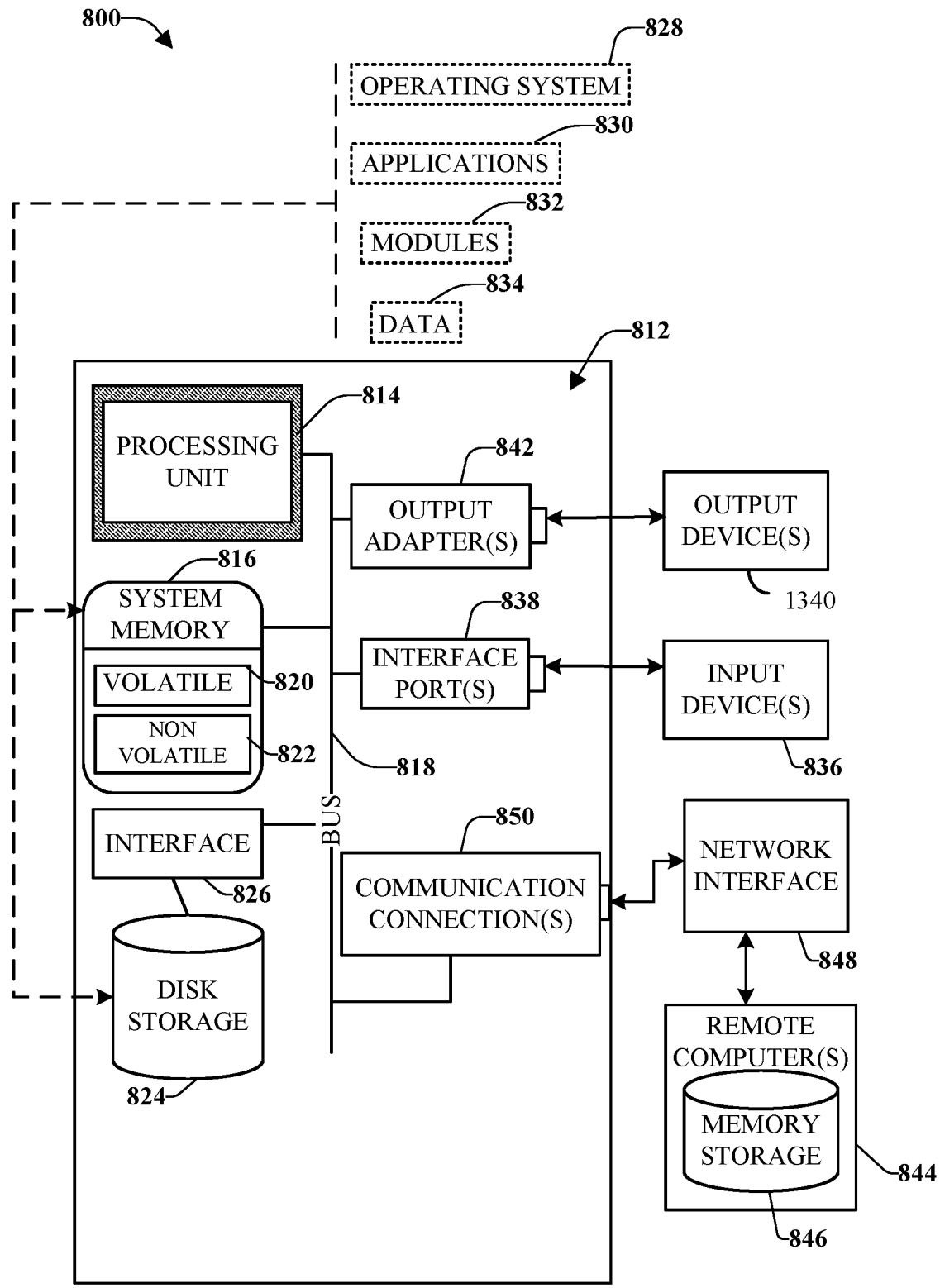
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/nonvolatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between entities and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
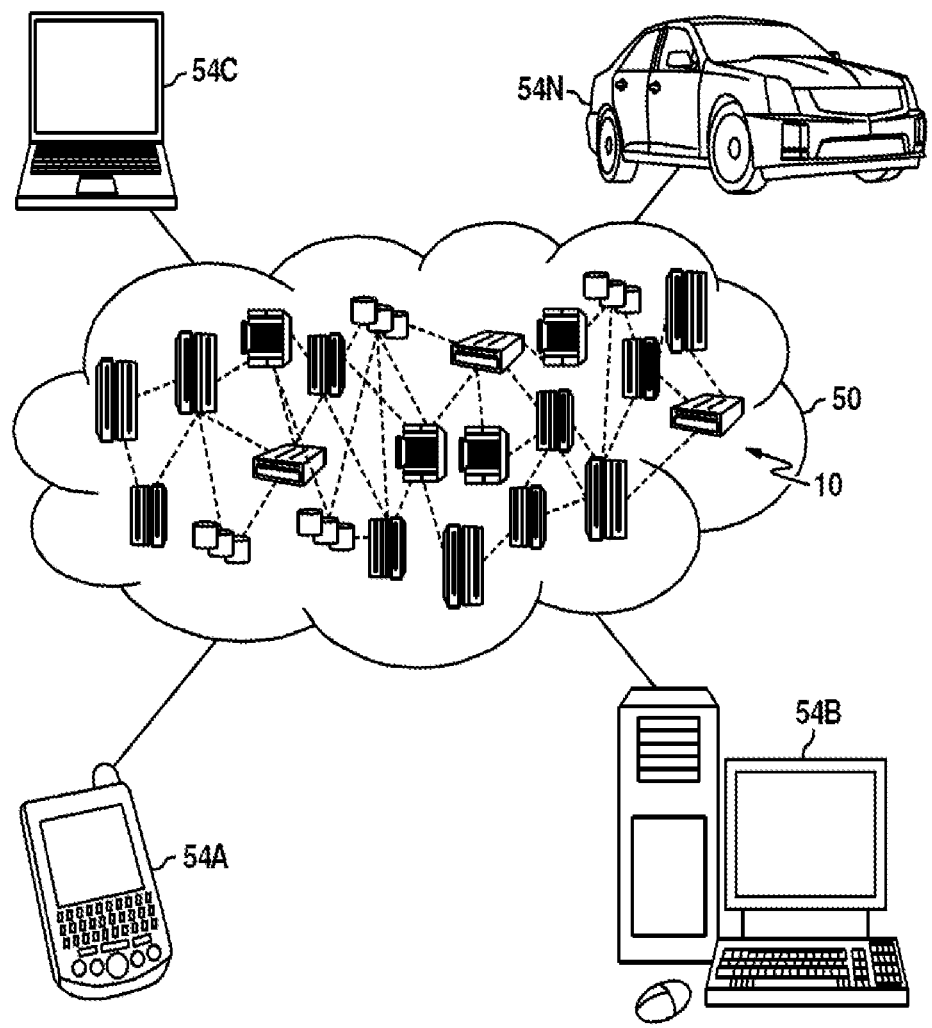
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
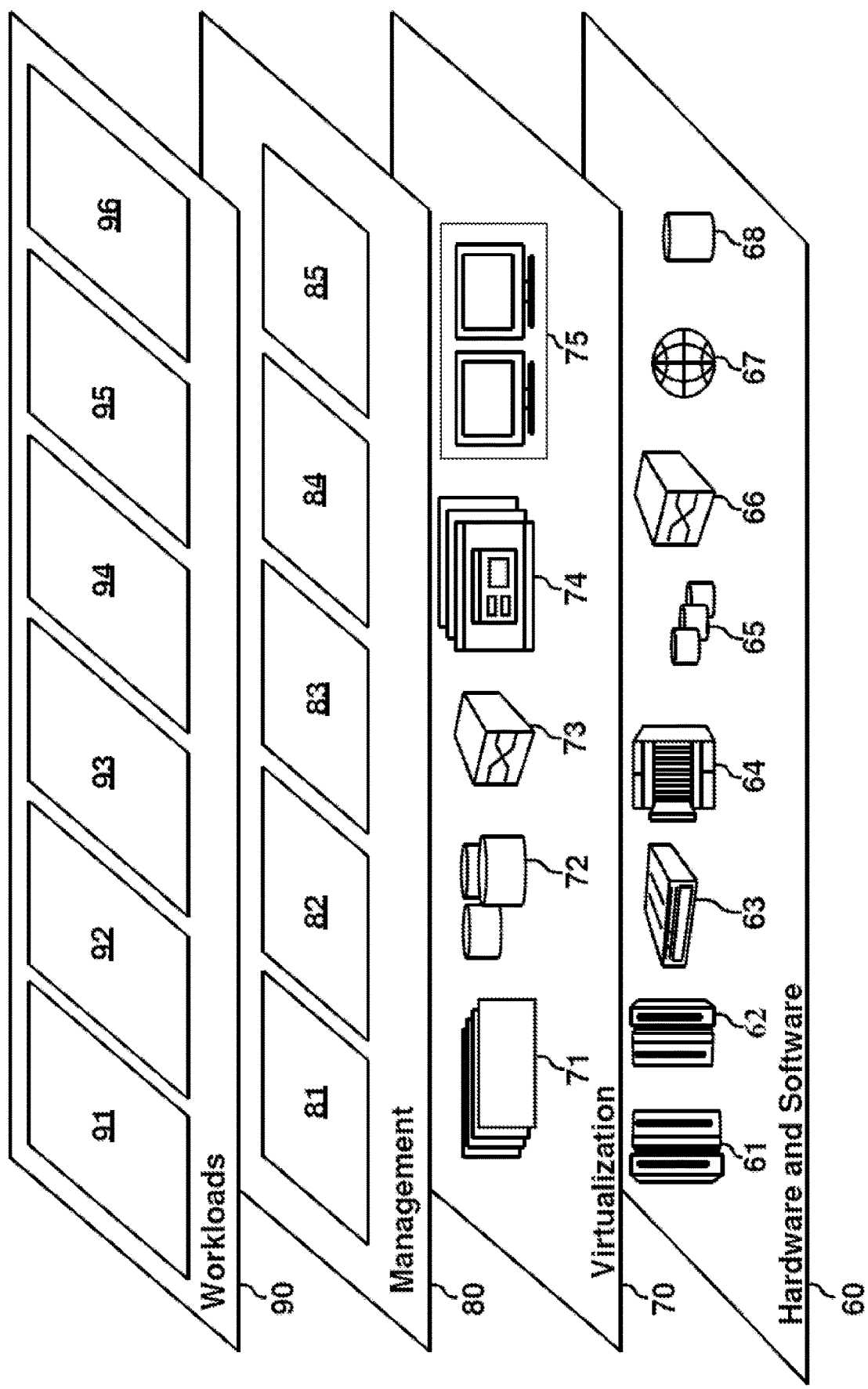
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, the procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating node processing capacity values for order fulfillment 96.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product facilitating mitigation of a dangerous activity, the computer program product comprising a non-transitory computer readable storage medium having program instructions embodied therewith, the program instructions executable by a processing component to cause the processing component to:

detect, by the processing component, a trigger event based on a first risk level satisfying a defined condition, wherein the first risk level is associated with a first item of interest and a monitored behavior associated with the first item of interest, wherein the first item of interest comprises ingredients from a harmful recipe database, the first risk level is based on a multidimensional risk array, the monitored behavior comprises a sequential order in which the ingredients are purchased, and the harmful recipe database comprises recipes that can be employed to cause physical harm to at least one entity, and the first risk level provides an indication of a probability that the first item of interest will be employed in a recipe of the recipes to cause the physical harm to the at least one entity; and implement, by the processing component, an action that reduces the first risk level based on the trigger event, wherein the action is selected from a group of actions based on the first risk level, the first item of interest, and the monitored behavior, the action comprising a real-time modification to a website on which the monitored behavior is occurring that reduces the probability that the item of interest will be employed in the recipe of the recipes to cause the physical harm to the at least one entity.

2. The computer program product of claim 1, wherein the program instructions executable by the processing component further cause the processing component to:

modify, by the processing component, an attribute related to the monitored behavior comprising a purchase of the first item of interest, wherein the attribute is selected from a group consisting of a price, a timing, a location, a delivery characteristic, and an identity verification.

3. The computer program product of claim 1, wherein the monitored behavior comprises a first event performed in connection with a first entity and a second event performed in connection with a second entity, and wherein the first event and the second event are determined to be related based on an identity of a third entity that caused a performance of the trigger event and a determined relationship between the first entity, the second entity, and the third entity.

4. The computer program product of claim 3, wherein the first event and the second event are online purchases and the first entity and the second entity are different devices associated with respective online merchants.

5. The computer program product of claim 3, wherein the first event is an online purchase and the first entity is a device associated with an online merchant and the second event is an in-store purchase and the second entity is another device associated with a physical store.

6. A system, comprising:
   a memory that stores computer executable components; and
   a processor that executes the computer executable components stored in the memory, wherein the computer executable components comprise:
      an observation component that detects a trigger event based on a risk level satisfying a defined condition of the risk level, wherein the risk level is associated with an item of interest and a monitored behavior associated with the item of interest, wherein the item of interest comprises ingredients from a harmful recipe database comprising recipes that can be employed to cause physical harm to at least one entity, the monitored behavior comprises a sequential order in which the ingredients are purchased, and the security risk level provides an indication of a probability that the item of interest will be employed in a recipe of the recipes to cause the physical harm to the at least one entity; and
      an implementation component that performs an action that reduces the risk level based on the trigger event, wherein the action is selected from a group of actions based on the risk level, the item of interest, and the monitored behavior, the action comprising a real-time modification to a website on which the monitored behavior is occurring that reduces the probability that the item of interest will be employed in the recipe of the recipes to cause the physical harm to the at least one entity.

7. The system of claim 6, wherein the implementation component modifies an attribute related to the monitored behavior comprising a purchase of the item of interest, wherein the attribute is selected from a group consisting of a price, a timing, a location, a delivery characteristic, and an identity verification.

8. The system of claim 6, wherein the implementation component further outputs an alert to an entity distinct from the system.

* * * * *